July 31, 1951 A. J. HUCK 2,562,425
THERMOSTAT FOR WAFFLE IRONS
Filed Feb. 11, 1948
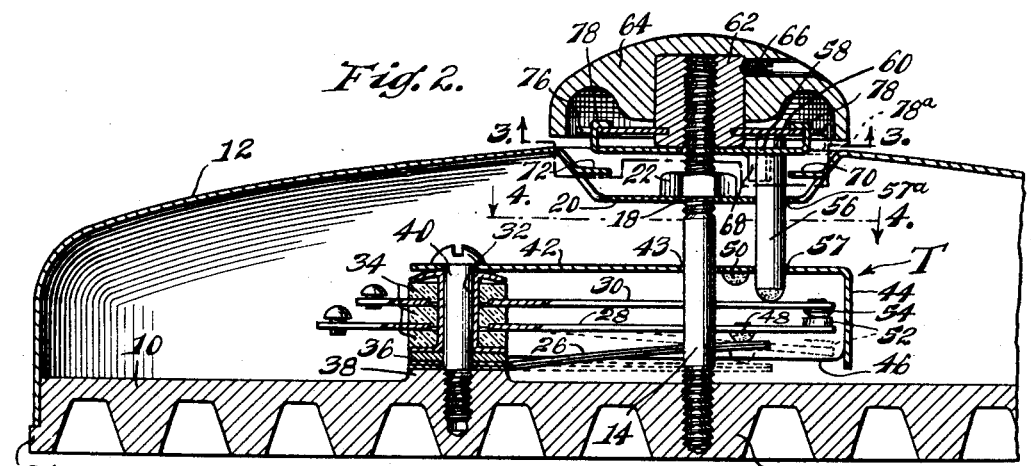
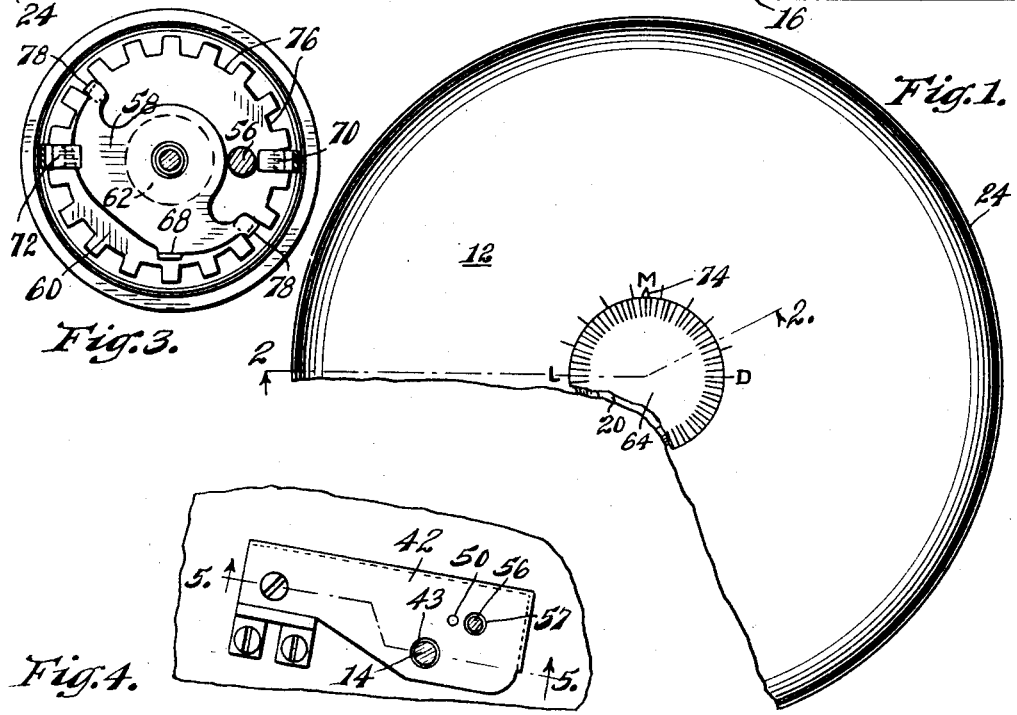
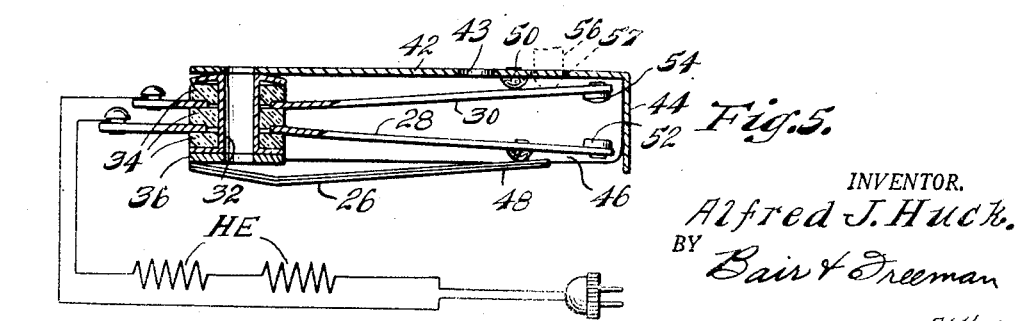
INVENTOR.
Alfred J. Huck.
BY Bair & Freeman
Attys.

Patented July 31, 1951

2,562,425

UNITED STATES PATENT OFFICE 2,562,425

THERMOSTAT FOR WAFFLE IRONS

Alfred J. Huck, St. Louis, Mo., assignor to Knapp-Monarch Company, St. Louis, Mo., a corporation of Delaware Application February 11, 1948, Serial No. 7,549

2 Claims. (Cl. 219—19)

This invention relates to a thermostat which is particularly designed for a waffle iron or similar electrical appliance having a casing element secured in position by a stud that screws into the grid or other cooking surface. These studs are usually centrally located with respect to the top shell of the appliance and it is also at this location that a thermostat is desirable so that the control knob thereof may be symmetrically located with respect to the shell.

My present invention has for one of its objects particularly to provide a construction that utilizes the stud both as a casing mounting means and as a support for the thermostat control knob in such manner that one function does not interfere with the other.

Another object of the invention is to utilize the shell supporting stud as a means on which the control knob is threaded so that rotation moves the knob toward or away from the shell and this movement effects adjustment of the thermostat.

Still another object is to provide a thermostat which is particularly responsive to the heat of the upper grid and thereby more accurately responsive to the temperature of the appliance as a whole as distinguished from a thermostat mounted in the base below the lower grid of the appliance.

A further object is to provide a thermostat in this location adjusted by means of a knob threaded on the center stud of the upper grid and coacting with the thermostat for adjusting it by means of a thrust pin connection.

Still a further object is to provide a thermostat and its adjusting means so arranged that the thermostat can be readily calibrated at the factory and thereafter any loosening of the knob does not change the calibration thereof.

With these and other objects in view, my invention consists in the construction, arrangement and combination of the various parts of my device whereby the objects contemplated are attained, as hereinafter more fully set forth, pointed out in my claims and illustrated in the accompanying drawings, wherein Fig. 1 is a plan view of a waffle iron showing my thermostat control knob located at the center thereof.

Fig. 2 is an enlarged vertical sectional view on the line 2—2 of Fig. 1, showing the thermostat and the relation of other parts thereto.

Fig. 3 is a sectional view on the line 3—3 of Fig. 2 showing a rotation limiting means and a factory adjustment mechanism for the calibration of the thermostat.

Fig. 4 is a plan view showing the mounting stud and a thrust pin in section on the line 4—4 of Fig. 2, and Fig. 5 is a sectional view on the line 5—5 of Fig. 4 showing the thermostat assembly per se.

On the accompanying drawing I have used the reference number 10 to indicate the upper grid of a waffle iron or this element may be the cooking surface of any type of appliance having upper and lower cooking surfaces as in a waffle iron. A shell 12 covers the grid 10 and houses the heating element located on the top surface of the grid in the usual manner. Since the heating element forms no part of my present invention it has not been shown except electro-diagrammatically in Fig. 5 at HE.

Top shells for waffle irons and the like are usually held in position by a stud at the center. My invention contemplates the use of a special stud 14 threaded on its lower and upper ends, the lower end being threaded into a center boss 16 of the grid 10. The upper end extends through an opening 18 in a depressed portion 20 of the top shell 12 and a nut 22 is threaded thereon for holding the shell down against an annular flange 24 around the periphery of the grid 10.

For controlling the temperature of the grid 10 I provide a thermostat indicated generally at T. The thermostat T comprises a bimetal blade 26, a pair of spring contact blades 28 and 30 and a grommet 32 for mounting the springs in assembled relation. A screw 40 is used to secure the thermostat assembly in position on a boss 38 with the bimetal element 26 in good thermal contact therewith by engaging flatwise against its upper surface. A flat metal washer 36 is interposed between the elements 32 and 26 to provide flat contact of the bimetal 26 against the grid 10.

The screw 40 also holds a thermostat casing in position comprising a top wall 42, an end wall 44 and a pair of side walls 46. The casing serves to minimize response of the bimetal element to radiant heat from the heating element, causing its major response to be a result of grid temperature.

Insulation buttons 48 and 50 are carried by the blade 28 and the casing top 42 to prevent grounding the heating element circuit at any time.

The heating element circuit may be traced in Fig. 5, the circuit being open at contacts 52 and 54 when the parts are in the initial position of Fig. 5. These contacts, however, normally are in the closed position as shown in Fig. 2 except when the bimetal element is warped by heat to the dotted position of Fig. 2 for cutting off the electric current because the temperature for which the thermostat has been set is exceeded as will hereinafter appear.

For adjusting the thermostat T I provide a thrust rod 56 slidable through an opening 57 of the thermostat casing top 42 and an opening 57a of the top shell 12. For sliding the thrust pin 56 I provide a thrust plate 60 to which a stop plate 58 is connected. The plate 60 is secured to an adjusting nut 62 threaded on the upper end of the stud 14 and on this nut a knob 64 is secured as by means of a set screw 66.

Assuming for the moment that the plates 58 and 60 form an integral unit, it will be obvious that the clockwise rotation of the nut 62 will move the plate 58 inwardly and thereby lower the thrust pin 56 so that the grid 10 has to attain a higher temperature before the bimetal element 26 will warp downwardly a sufficient amount to permit the contact 52 to be separated from the contact 54. The initial position of the spring 28 as shown in Fig. 5 causes such separation or a following of the insulation button 48 relative to the bimetal element 26. The spring 30 is biased upwardly so that it will follow the thrust pin 56.

The stop plate 58 is provided with a stop lug 68 adapted to travel about 180 degrees between stationary stop lugs 70 and 72 sheared from the depressed portion 20 of the casing shell 12 and struck inwardly as shown in Fig. 2. The shell may be provided with indicia as shown in Fig. 1 such as L, M and D for light, medium and dark waffles. The knob may be provided with a pointer 74 for coaction with such indicia.

Returning now to the plates 58 and 60, the periphery of the latter is provided with spaced notches 76 to receive a pair of lugs 78 of the plate 58, the purpose of this construction being for calibration at the factory. Calibration is performed by heating the appliance to the desired cooking or baking temperature with the adjusting nut 62 screwed far enough on the stud 14 that the thermostat does not open. When such temperature is attained the nut is rotated until the circuit is just broken.

During this operation the lugs 78 are in an initial position shown by dotted lines 78a at the right side of Fig. 2. The plate 58 is positioned as in Fig. 2 with the stop lug 68 midway between the lugs 70 and 72. The lugs 78 are then bent up to the full line position in whatever pair of notches register with them at that time. The knob 64 is placed on the stud 14, its pointer rotated to the "medium" position M of Fig. 1 and the set screw 66 tightened. The knob 64 is properly located on the nut 62 by the set screw 66 and the pointer 74 is adjusted to the "medium" position. The appliance is now ready for operation with assurance that looseness of the knob will not therafter change the setting.

With my method of assembly no strains are permitted to enter the bimetal during assembly and they may therefore be heat treated alone prior to assembly. This reduces oven size requirements and labor handling. The bimetal when mounting maintains a solid flat contact with the grid (upper surface of boss 38) which insures accuracy and stability of temperature response. The pressure load on the bimetal is very small in the cold condition (the spring 28 held up by it as in Fig. 2) and becomes almost zero at the operating position when the contacts are separated. Only one screw is necessary to mount the thermostat as an opening 43 in the casing top 42 surrounds the stud 14 to prevent any rotation of the thermostat. The thermostat is readily calibrated and after the lugs 78 are bent to their proper position the control knob 64 is thereafter movable through a limited range as determined by the travel of the lug 68 between the lugs 70 and 72.

It will be obvious from the foregoing specification that I have provided a construction which utilizes the stud 14 for the purpose of mounting the top shell 12 and also the thermostat adjusting knob without one interfering with the other. The location of the thermostat is such as to be most effective in its response to grid temperatures. The location of its adjusting knob is such as to be desirable both from the standpoint of concealing the connecting means of the shell to the grid and from the standpoint of appearance, its location being best when at the center of the shell.

Some changes may be made in the contsruction and arrangement of the parts of my device without departing from the real spirit and purpose of my invention, and it is my intention to cover by my claims any modified forms of structure or use of mechanical equivalents which may be reasonably included within their scope.

I claim as my invention:

1. In an electrical appliance, a cooking grid, a thermostat thereon, a stud extending from said grid past said thermostat, a shell over said grid and thermostat, said stud extending therethrough, means of coaction between said stud and said shell to retain the shell in position, an adjusting knob threaded on said stud and including a thrust plate, a thrust pin connector between said thrust plate and said thermostat, said thrust pin extending through said shell, and calibration means comprising a plate rotatable on said stud, said thrust plate and said last plate having lug and notch coaction with each other.

2. In an electrical appliance, a thermostat therefor, a threaded element carried by said appliance, an adjusting knob threaded on said threaded element and including a thrust plate, a thrust pin connector interposed between said thrust plate and said thermostat, and calibration means comprising a stop plate rotatable on said threaded element, said thrust plate and said stop plate having annularly arranged lug and notch coaction with each other, said stop plate having a stop projection adapted to coact with said shell to limit rotation of said adjusting knob.

ALFRED J. HUCK.

REFERENCES CITED

The following references are of record in the file of this patent:

UNITED STATES PATENTS

| Number | Name | Date |
| --- | --- | --- |
| Re. 22,048 | Kuhn et al. | Mar. 10, 1942 |
| 1,613,770 | Reichold | Jan. 11, 1927 |
| 1,627,922 | Myers | May 10, 1927 |
| 1,764,908 | Strauss | June 17, 1930 |
| 1,975,736 | Vaughan | Oct. 2, 1934 |
| 2,267,387 | Winborne | Dec. 23, 1941 |
| 2,282,089 | Propernick | May 5, 1942 |
| 2,420,195 | Riker | May 6, 1947 |
| 2,439,825 | Sparklin | Apr. 20, 1948 |